US012417735B2

(12) United States Patent
Jeong et al.

(10) Patent No.: US 12,417,735 B2
(45) Date of Patent: Sep. 16, 2025

(54) PIXEL AND DISPLAY DEVICE INCLUDING THE SAME

(71) Applicant: Samsung Display Co., LTD., Yongin-si (KR)

(72) Inventors: Keuk-Jin Jeong, Yongin-si (KR); Wongyun Kim, Yongin-si (KR); Min Kang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/887,359

(22) Filed: Sep. 17, 2024

(65) Prior Publication Data

US 2025/0104613 A1 Mar. 27, 2025

(51) Int. Cl.
*G09G 3/32* (2016.01)
*G09G 3/3233* (2016.01)

(52) U.S. Cl.
CPC ............. *G09G 3/32* (2013.01); *G09G 3/3233* (2013.01)

(58) Field of Classification Search
CPC ................... G09G 3/32; G09G 3/3233; G09G 2300/0426; G09G 2300/0852; G09G 2310/08; G09G 2330/028
See application file for complete search history.

(56) References Cited

FOREIGN PATENT DOCUMENTS

| | | | |
|---|---|---|---|
| CN | 109785800 | A | 5/2019 |
| JP | 2021128194 | A | 9/2021 |

OTHER PUBLICATIONS

Kei KIMURA, et al., "New pixel driving circuit using self-discharging compensation method for highresolution OLED micro displays on a silicon backplane", Journal of the SID 25/3, 2017, (10 pages).

*Primary Examiner* — Andrew Sasinowski
(74) *Attorney, Agent, or Firm* — CANTOR COLBURN LLP

(57) ABSTRACT

A pixel includes a first transistor including a gate electrode connected to a first node and connected between a second node and a third node, a second transistor including a gate electrode receiving a first power voltage, a first electrode receiving a second power voltage, and a second electrode connected to the third node, a third transistor including a gate electrode receiving a gate signal and connected between a data line and the first node, a fourth transistor including a gate electrode receiving a first emission signal and connected between the gate electrode of the second transistor and the second node, a fifth transistor including a gate electrode receiving a second emission signal and a first electrode connected to the third node, and a light emitting element including an anode electrode connected to the second electrode of the fifth transistor and a cathode electrode receiving a third power voltage.

20 Claims, 12 Drawing Sheets

PIXEL AND DISPLAY DEVICE INCLUDING THE SAME

CROSS-REFERENCE TO RELATED APPLICATION(S)

This application claims priority to Korean Patent Application No. 10-2023-0126490, filed on Sep. 21, 2023, and all the benefits accruing therefrom under 35 U.S.C. § 119, the content of which in its entirety is herein incorporated by reference.

BACKGROUND

1. Field

Embodiments relate to a display device. More particularly, embodiments relate to a pixel having a small area and a display device including the pixel.

2. Description of the Related Art

In general, a display device may include a display panel and a display panel driver. The display panel may include gate lines, data lines, emission lines, and pixels. The display panel driver may include a gate driver configured to provide gate signals to the gate lines, a data driver configured to provide data voltages to the data lines, an emission driver configured to provide emission signals to the emission lines, and a driving controller configured to control the gate driver, the data driver, and the emission driver.

A display device configured to provide virtual reality (VR), augmented reality (AR), or the like has recently been spotlighted. To this end, the display device may include a pixel having a small area. In this case, for example, the relatively small area may result in restrictions on the number of transistors included in the pixel and the number of lines configured to provide signals to the pixel.

SUMMARY

Embodiments provide a pixel having a small area.

Embodiments provide a display device having a high pixel per inch (PPI).

A pixel according to embodiments may include a first transistor including a gate electrode connected to a first node, a first electrode connected to a second node, and a second electrode connected to a third node, a second transistor including a gate electrode configured to receive a first power voltage, a first electrode configured to receive a second power voltage, and a second electrode connected to the third node, a third transistor including a gate electrode configured to receive a gate signal, a first electrode connected to a data line configured to provide a reference voltage or a data voltage, and a second electrode connected to the first node, a fourth transistor including a gate electrode configured to receive a first emission signal, a first electrode configured to receive the first power voltage, and a second electrode connected to the second node, a fifth transistor including a gate electrode configured to receive a second emission signal, a first electrode connected to the third node, and a second electrode, a storage capacitor including a first electrode connected to the first node, and a second electrode connected to the second node, and a light emitting element including an anode electrode connected to the second electrode of the fifth transistor and a cathode electrode configured to receive a third power voltage.

In an embodiment, the first power voltage may have alternating voltage levels. In some embodiments, the first power voltage may be alternated according to a first voltage level and a second voltage level.

In an embodiment, the pixel may further include a hold capacitor including a first electrode configured to receive the second power voltage and a second electrode connected to the second node.

In an embodiment, in a first period, each of the first power voltage and the second emission signal may be of a high voltage level, each of the first emission signal and the gate signal may be of a low voltage level, and the data line may provide the reference voltage.

In an embodiment, in the first period, the reference voltage may be applied to the first node, and the first power voltage of the high voltage level may be applied to the second node.

In an embodiment, in a second period after the first period, each of the first power voltage and the gate signal may be of the low voltage level, each of the first emission signal and the second emission signal may be of the high voltage level, and the data line may provide the reference voltage.

In an embodiment, in the second period, the storage capacitor may store a threshold voltage of the first transistor.

In an embodiment, in the second period, a current may flow from the second node through the first transistor and the second transistor.

In an embodiment, in a third period after the second period, each of the first power voltage and the gate signal may be of the low voltage level, each of the first emission signal and the second emission signal may be of the high voltage level, and the data line may provide the data voltage.

In an embodiment, in the third period, the data voltage may be applied to the first node.

In an embodiment, in the third period, voltage division may be performed on a voltage of the second node by the storage capacitor and the hold capacitor.

In an embodiment, in a fourth period after the third period, each of the first power voltage and the gate signal may be of the high voltage level, each of the first emission signal and the second emission signal may be of the low voltage level, and the data line may provide the reference voltage.

In an embodiment, in the fourth period, a driving current of the first transistor may flow to the light emitting element.

In an embodiment, the second power voltage may be of a ground voltage level.

In an embodiment, each of the first transistor, the second transistor, the third transistor, the fourth transistor, and the fifth transistor may be a P-type transistor.

A display device according to embodiments may include a display panel including a pixel, and a display panel driver configured to drive the display panel. The pixel may include a first transistor including a gate electrode connected to a first node, a first electrode connected to a second node, and a second electrode connected to a third node, a second transistor including a gate electrode configured to receive a first power voltage, a first electrode configured to receive a second power voltage, and a second electrode connected to the third node, a third transistor including a gate electrode configured to receive a gate signal, a first electrode connected to a data line configured to provide a reference voltage or a data voltage, and a second electrode connected to the first node, a fourth transistor including a gate electrode configured to receive a first emission signal, a first electrode configured to receive the first power voltage, and a second electrode connected to the second node, a fifth transistor including a gate electrode configured to receive a second emission signal, a first electrode connected to the third node, and a second electrode, a storage capacitor including a first electrode connected to the first node, and a second electrode connected to the second node, and a light emitting element including an anode electrode connected to the second electrode of the fifth transistor and a cathode electrode configured to receive a third power voltage.

In an embodiment, the first power voltage may have alternating voltage levels. In some embodiments, the display device may be configured to alternate the first power voltage according to a first voltage level and a second voltage level.

In an embodiment, the pixel may further include a hold capacitor including a first electrode configured to receive the second power voltage and a second electrode connected to the second node.

In an embodiment, the second power voltage may be of a ground voltage level.

In an embodiment, each of the first transistor, the second transistor, the third transistor, the fourth transistor, and the fifth transistor may be a P-type transistor.

In the pixel and the display device according to the embodiments, the second transistor may be turned on in response to the first power voltage having the alternating voltage levels, such that a signal for operating the second transistor may be omitted. Further, the fifth transistor, which is turned off when the threshold voltage of the first transistor is compensated, may be disposed between the first transistor and the light emitting element thereby preventing a current from flowing through the light emitting element when the threshold voltage of the first transistor is compensated. Accordingly, for example, display quality of the display device may be improved.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
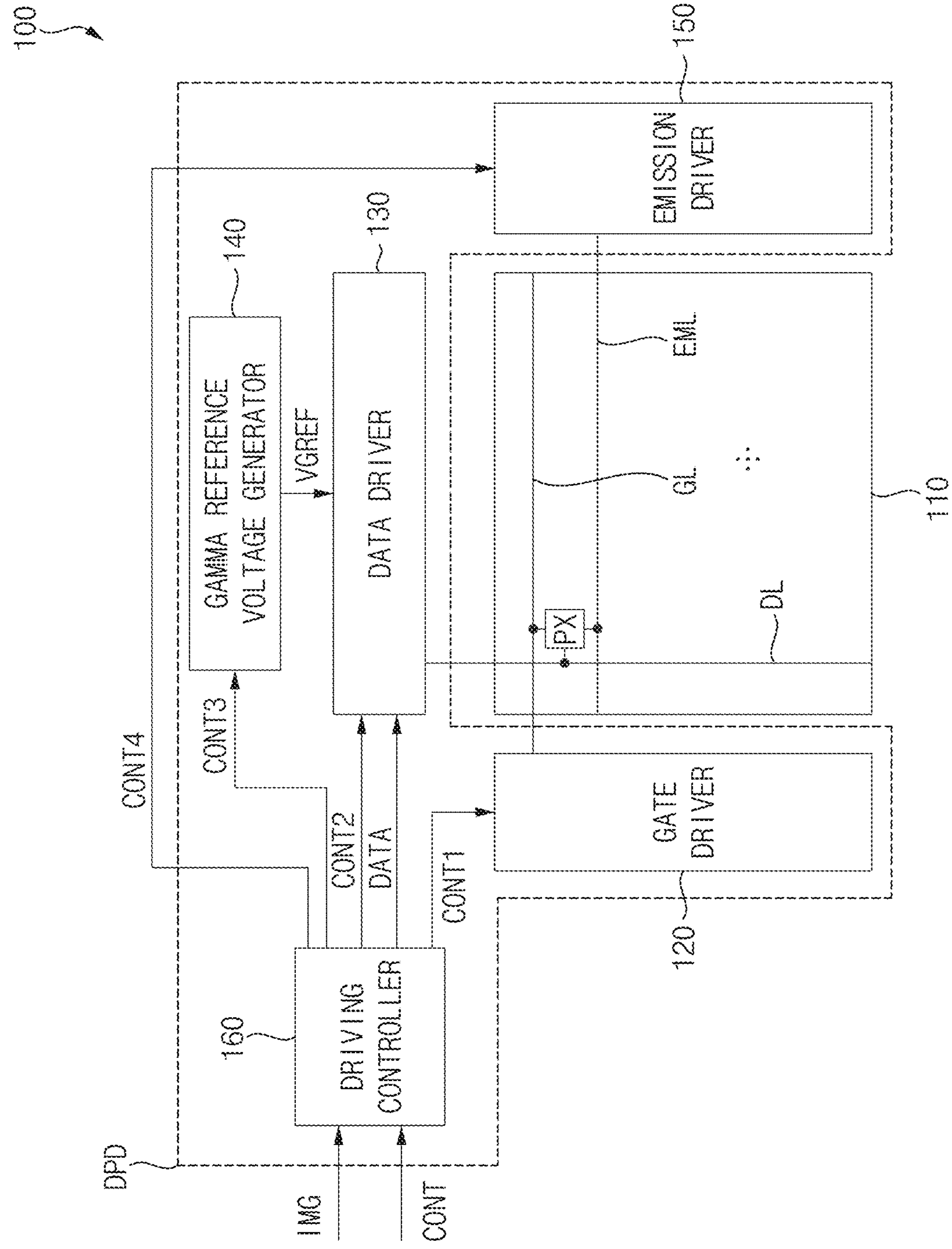
FIG. 1 is a block diagram illustrating a display device according to an embodiment of the present disclosure.

Hereinafter, a pixel and a display device according to embodiments of the present disclosure will be described in more detail with reference to the accompanying drawings. The same or similar reference numerals will be used for the same elements in the accompanying drawings.

FIG. 1 is a block diagram illustrating a display device 100 according to an embodiment of the present disclosure.

Referring to FIG. 1, the display device 100 may include a display panel 110 and a display panel driver DPD. The display panel driver DPD may include a gate driver 120, a data driver 130, a gamma reference voltage generator 140, an emission driver 150, and a driving controller 160.

The display panel 110 may include a display region configured to display an image, and the display panel 110 may include a peripheral region that is adjacent to the display region. In some aspects, the display panel 110 may not display the image in the peripheral region.

According to an embodiment, the display panel 110 may be an organic light emitting diode display panel including an organic light emitting diode. According to an embodiment, the display panel 110 may be a quantum-dot organic light emitting diode display panel including an organic light emitting diode and a quantum-dot color filter. For example, the display panel 110 may include multiple organic light emitting diodes and quantum-dot color filters. According to an embodiment, the display panel 110 may be a quantum-dot nano-light emitting diode display panel including a nano-light emitting diode and a quantum-dot color filter. For example, the display panel 110 may include multiple nano-light emitting diodes and quantum-dot color filters. According to an embodiment, the display panel 110 may be a liquid crystal display panel including a liquid crystal layer.

The display panel 110 may include gate lines GL, data lines DL, emission lines EML, and pixels PX electrically connected to the gate lines GL, the data lines DL, and the emission lines EML. The gate lines GL may extend in a first direction, the data lines DL may extend in a second direction that intersects the first direction, and the emission lines EML may extend in the first direction.

The gate driver 120 may generate gate signals in response to a first control signal CONT1 received from the driving controller 160. The gate driver 120 may output the gate signals to the gate lines GL. For example, the gate driver 120 may generate and output gate signals GW described herein. According to an embodiment, the gate driver 120 may be disposed in the peripheral region of the display panel 110.

The data driver 130 may receive a second control signal CONT2 and data signals DATA from the driving controller 160, and the data driver 130 may receive a gamma reference voltage VGREF from the gamma reference voltage generator 140. The data driver 130 may convert the data signals DATA into analog data voltages by using the gamma reference voltage VGREF. The data driver 130 may output the analog data voltages to the data lines DL.

The gamma reference voltage generator 140 may generate the gamma reference voltage VGREF based on (e.g., in response to) a third control signal CONT3 received from the driving controller 160. The gamma reference voltage generator 140 may provide the gamma reference voltage VGREF to the data driver 130. The gamma reference voltage VGREF may have a value corresponding to each of the data signals DATA. According to an embodiment, the gamma reference voltage generator 140 may be disposed within the driving controller 160 or be disposed within the data driver 130.

The emission driver 150 may generate emission signals based on (e.g., in response to) a fourth control signal CONT4 received from the driving controller 160. The emission driver 150 may output the emission signals to the emission lines EML. For example, the emission driver 150 may generate and output a first emission signal EM1 and a second emission signal EM2 described herein. According to an embodiment, the emission driver 150 may be disposed in the peripheral region of the display panel 110.

Although an embodiment in which the gate driver 120 is disposed on a first side of the display panel 110 and the emission driver 150 is disposed on a second side of the display panel 110 has been illustrated in FIG. 1 for convenience of description, embodiments supported by the present disclosure are not limited thereto. According to an embodiment, both the gate driver 120 and the emission driver 150 may be disposed on the first side or the second side of the display panel 110. According to an embodiment, both the gate driver 120 and the emission driver 150 may be disposed on both sides of the display panel 110. That is, for example, the display device 100 may include a gate driver 120 and a emission driver 150 on both the first side and the second side of the display device 100. According to an embodiment, the gate driver 120 and the emission driver 150 may be formed integrally with each other.

The driving controller 160 may receive input image data IMG and an input control signal CONT from an external device. According to an embodiment, the input image data IMG may include red image data, green image data, and blue image data. According to an embodiment, the input image data IMG may further include white image data. According to an embodiment, the input image data IMG may include magenta image data, yellow image data, and cyan image data. The input control signal CONT may include multiple signals. For example, the input control signal CONT may include a master clock signal, a data enable signal, and the like. The input control signal CONT may further include a vertical synchronization signal, a horizontal synchronization signal, and the like.

The driving controller 160 may generate the first control signal CONT1, the second control signal CONT2, the third control signal CONT3, the fourth control signal CONT4, and the data signals DATA based on the input image data IMG and the input control signal CONT.

The driving controller 160 may generate the first control signal CONT1 for controlling an operation of the gate driver 120 based on the input control signal CONT. The first control signal CONT1 may include a vertical start signal, a gate clock signal, and the like.

The driving controller 160 may generate the second control signal CONT2 for controlling an operation of the data driver 130 based on the input control signal CONT. The second control signal CONT2 may include a horizontal start signal, a load signal, and the like.

The driving controller 160 may generate the data signals DATA based on the input image data IMG. The driving controller 160 may output the data signals DATA to the data driver 130.

The driving controller 160 may generate the third control signal CONT3 for controlling an operation of the gamma reference voltage generator 140 based on the input control signal CONT. The driving controller 160 may generate the fourth control signal CONT4 for controlling an operation of the emission driver 150 based on the input control signal CONT.

According to an embodiment, the driving controller 160 and the data driver 130 may be formed integrally with each other. For example, the driving controller 160 and the data driver 130 may be formed integrally with each other as a timing controller-embedded data driver (TED). According to an embodiment, the driving controller 160, the gamma reference voltage generator 140, and the data driver 130 may be formed integrally with each other.

Figure 2:
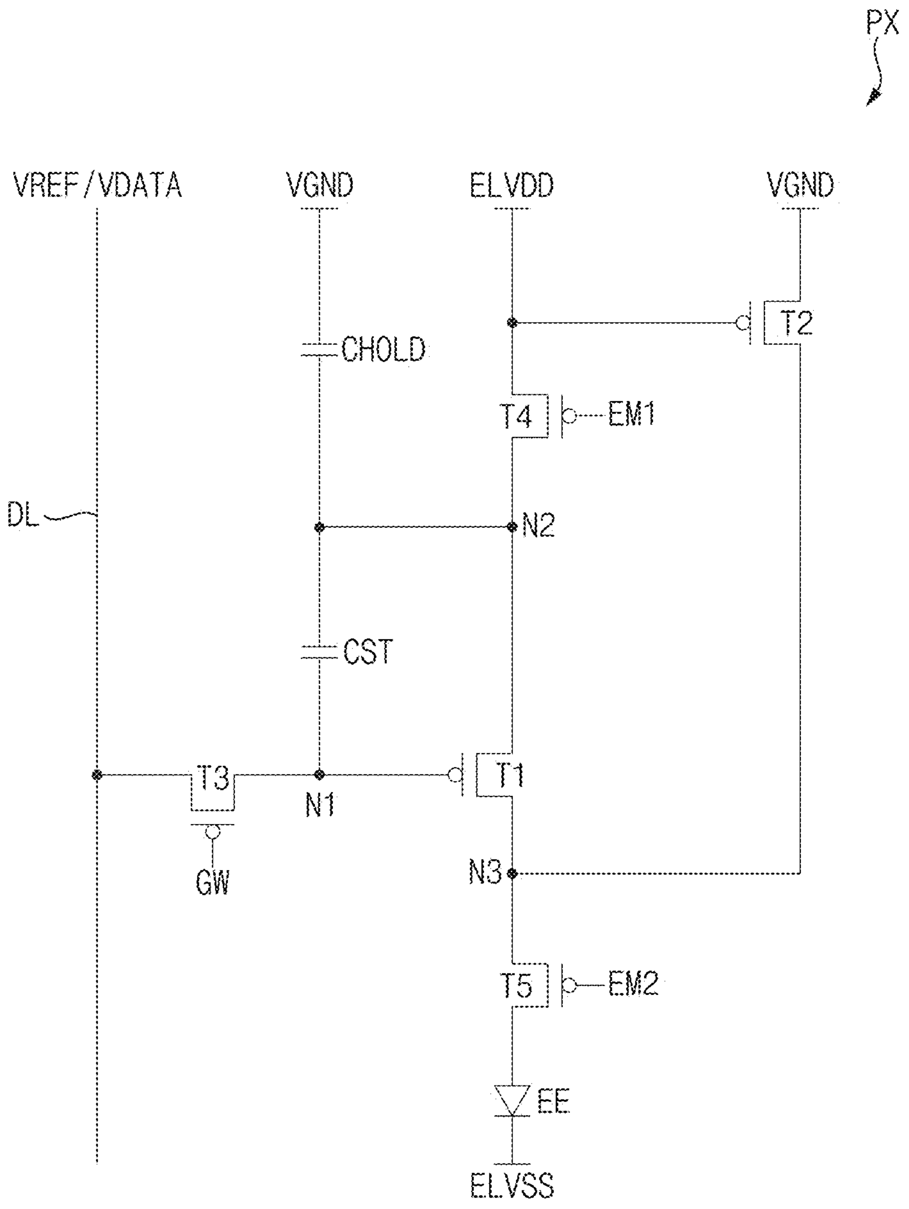
FIG. 2 is a circuit diagram illustrating a pixel included in the display device of FIG. 1.

FIG. 2 is a circuit diagram illustrating a pixel PX included in the display device 100 of FIG. 1.

Referring to FIG. 2, a pixel PX may include a first transistor T1, a second transistor T2, a third transistor T3, a fourth transistor T4, a fifth transistor T5, a storage capacitor CST, and a light emitting element EE. According to an embodiment, the pixel PX may further include a hold capacitor CHOLD.

The first transistor T1 may include a gate electrode connected to a first node N1, a first electrode connected to a second node N2, and a second electrode connected to a third node N3. The first transistor T1 may be referred to as a driving transistor.

The second transistor T2 may include a gate electrode configured to receive a first power voltage ELVDD, a first electrode configured to receive a second power voltage VGND, and a second electrode connected to the third node N3. The second transistor T2 may be referred to as a compensation transistor.

The first power voltage ELVDD may have alternating voltage levels. According to an embodiment, the first power voltage ELVDD may have alternating high and low voltage levels. For example, the display device 100 may provide the first power voltage ELVDD to the pixel PX according to high and low voltage levels. In some embodiments, the display device 100 may provide the first power voltage ELVDD to the pixel PX such that the first power voltage ELVDD is of a high voltage level for one or more periods, is of a low voltage level for one or more subsequent periods, is of the high voltage level for one or more further subsequent periods, and the like.

The second power voltage VGND may have a constant voltage level. According to an embodiment, the second power voltage VGND may be of a ground voltage level.

The third transistor T3 may include a gate electrode configured to receive a gate signal GW, a first electrode connected to a data line DL configured to provide a reference voltage VREF or a data voltage VDATA, and a second electrode connected to the first node N1. The third transistor T3 may be referred to as a write transistor.

The fourth transistor T4 may include a gate electrode configured to receive a first emission signal EM1, a first electrode configured to receive the first power voltage ELVDD, and a second electrode connected to the second node N2. The fourth transistor T4 may be referred to as a first emission control transistor.

The fifth transistor T5 may include a gate electrode configured to receive a second emission signal EM2, a first electrode connected to the third node N3, and a second electrode. The fifth transistor T5 may be referred to as a second emission control transistor.

According to an embodiment, each of the first transistor T1, the second transistor T2, the third transistor T3, the fourth transistor T4, and the fifth transistor T5 may be a P-type transistor (e.g., a PMOS transistor). The P-type transistor may be turned on in response to a signal of a low voltage level (e.g., a voltage level at or below a threshold value), and the P-type transistor may be turned off in response to a signal of a high voltage level (e.g., a voltage level at or above a threshold value). According to an embodiment, at least one of the first transistor T1, the second transistor T2, the third transistor T3, the fourth transistor T4, and the fifth transistor T5 may be an N-type transistor (e.g., an NMOS transistor). The N-type transistor may be turned on in response to a signal of a high voltage level, and the N-type transistor may be turned off in response to a signal of a low voltage level.

References to a transistor being turned on may refer to the transistor being in an ON state, and references to a transistor being turned off may refer to the transistor being in an OFF state. References to a low voltage level (of a signal) may refer to a voltage level at or below a threshold value, and references to a high voltage level (of a signal) may refer to a voltage level at or above a threshold value.

The storage capacitor CST may include a first electrode connected to the first node N1 and a second electrode connected to the second node N2.

The hold capacitor CHOLD may include a first electrode configured to receive the second power voltage VGND, and a second electrode connected to the second node N2.

The light emitting element EE may include an anode electrode connected to the second electrode of the fifth transistor T5, and a cathode electrode configured to receive a third power voltage ELVSS. According to an embodiment, the light emitting element EE may be an organic light emitting diode. According to an embodiment, the light emitting element EE may be an inorganic light emitting diode, a quantum-dot light emitting diode, a micro-light emitting diode, or the like.

The third power voltage ELVSS may have a constant voltage level. The third power voltage ELVSS may be of a voltage level that is lower than the high voltage level of the first power voltage ELVDD.

Figure 3:
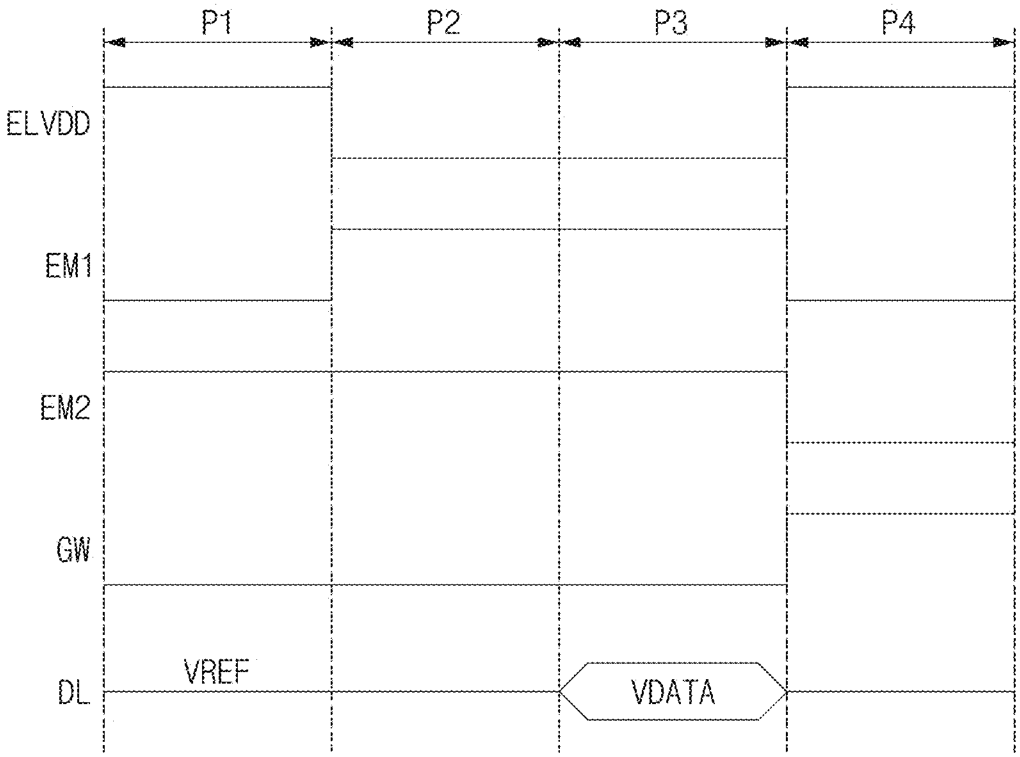
FIG. 3 is a view for describing an operation of the pixel of FIG. 2.

FIG. 3 is a view for describing an operation of the pixel PX of FIG. 2. In the example timing diagram of FIG. 3 (and similarly, FIGS. 4, 6, 8, and 10), the horizontal axis may represent time, and the vertical axis may represent voltage level.

Referring to FIGS. 2 and 3, a frame period of the pixel PX may include a first period P1, a second period P2, a third period P3, and a fourth period P4. The frame period and the first period P1 through fourth period P4 may be referred to as temporal periods, temporal durations, or operating periods.

In the first period P1, each of the first power voltage ELVDD and the second emission signal EM2 may be of a high voltage level, each of the first emission signal EM1 and the gate signal GW may be of a low voltage level, and the data line DL may provide the reference voltage VREF. The first period P1 may be referred to as an initialization period.

In the second period P2 after the first period P1, each of the first power voltage ELVDD and the gate signal GW may have the low voltage level, each of the first emission signal EM1 and the second emission signal EM2 may have the high voltage level, and the data line DL may provide the reference voltage VREF. The second period P2 may be referred to as a compensation period.

In the third period P3 after the second period P2, each of the first power voltage ELVDD and the gate signal GW may have the low voltage level, each of the first emission signal EM1 and the second emission signal EM2 may have the high voltage level, and the data line DL may provide the data voltage VDATA. In some aspects, in the third period P3, the data voltage VDATA is applied to the first node. In some aspects, in the third period P3, voltage division is performed on a voltage of the second node by the storage capacitor CST and the hold capacitor CHOLD (e.g., based on respective impedances of the storage capacitor CST and the hold capacitor CHOLD). The third period P3 may be referred to as a write period.

In the fourth period P4 after the third period P3, each of the first power voltage ELVDD and the gate signal GW may have the high voltage level, each of the first emission signal EM1 and the second emission signal EM2 may have the low voltage level, and the data line DL may provide the reference voltage VREF. In some aspects, in the fourth period P4, a driving current of the first transistor T1 may flow to the light emitting element EE. The fourth period P4 may be referred to as an emission period.

Figure 4:
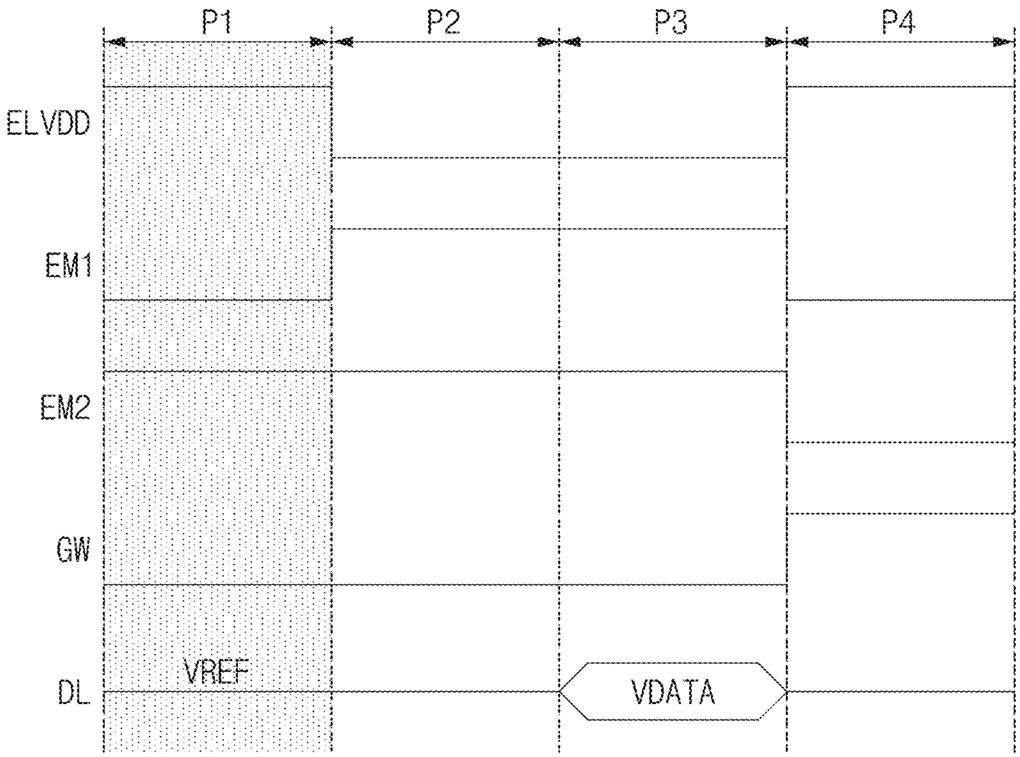
FIGS. 4 and 5 are views for describing the operation of the pixel of FIG. 2 in a first period of FIG. 3.
Figure 5:
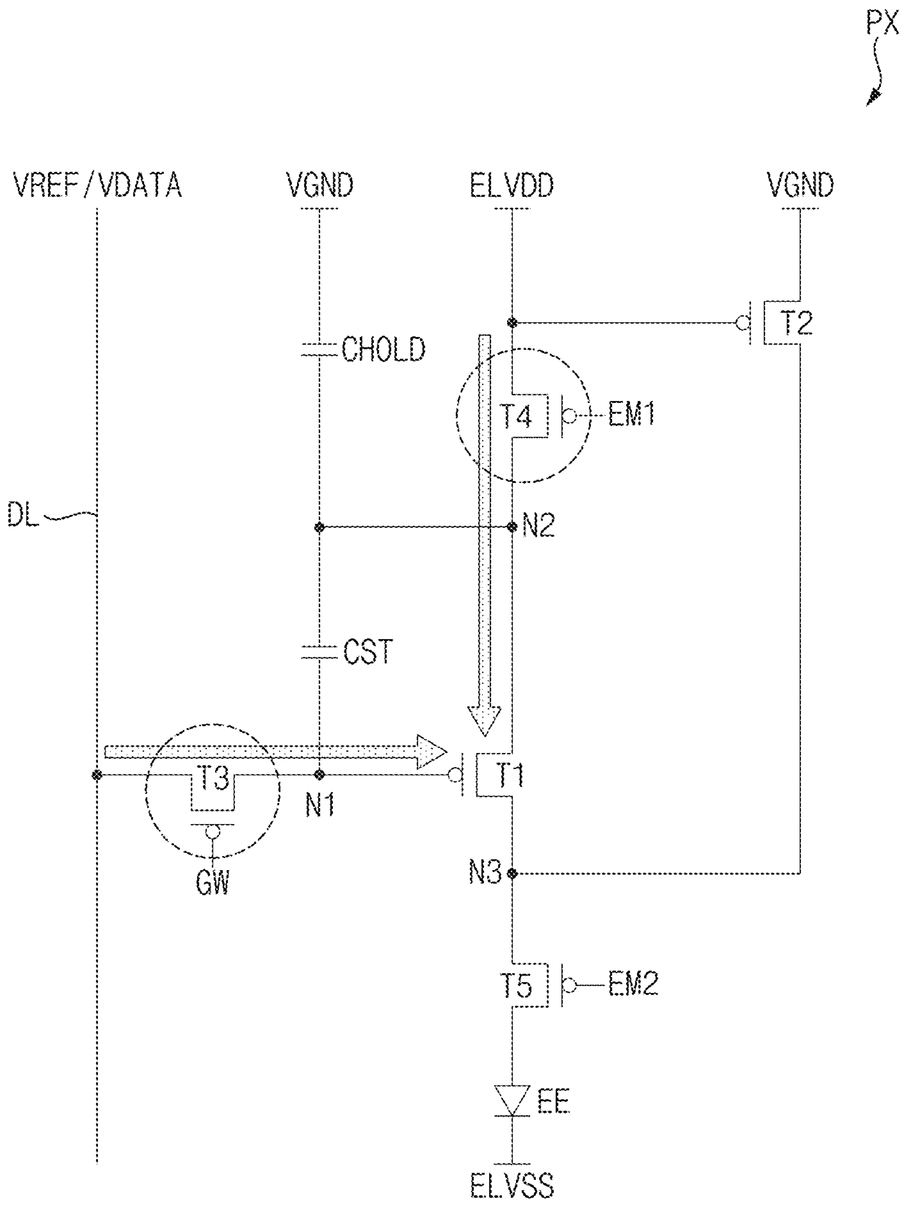

FIGS. 4 and 5 are views for describing the operation of the pixel PX of FIG. 2 in a first period P1 of FIG. 3.

Referring to FIGS. 4 and 5, in the first period P1, the third transistor T3 and the fourth transistor T4 may be turned on, and the second transistor T2 and the fifth transistor T5 may be turned off. For example, in the first period P1, the third transistor T3 and the fourth transistor T4 are respectively turned on by the gate signal GW (of a low voltage level) and the first emission signal EM1 (of a low voltage level), and the second transistor T2 and the fifth transistor T5 are respectively turned off by the first power voltage ELVDD (of a high voltage level) and the second emission signal EM2 (of a high voltage level).

When the data line DL provides the reference voltage VREF, and the third transistor T3 is turned on (e.g., is in an ON state), the third transistor T3 may provide the reference voltage VREF to the first node N1 (i.e., the gate electrode of the first transistor T1). Accordingly, for example, the first node N1 may be initialized to the reference voltage VREF.

When the first power voltage ELVDD is of the high voltage level, and the fourth transistor T4 is turned on (e.g., is in an ON state), the fourth transistor T4 may provide the first power voltage ELVDD of the high voltage level to the second node N2 (i.e., the first electrode of the first transistor T1). Accordingly, for example, the second node N2 may be initialized to the first power voltage ELVDD of the high voltage level.

Figure 6:
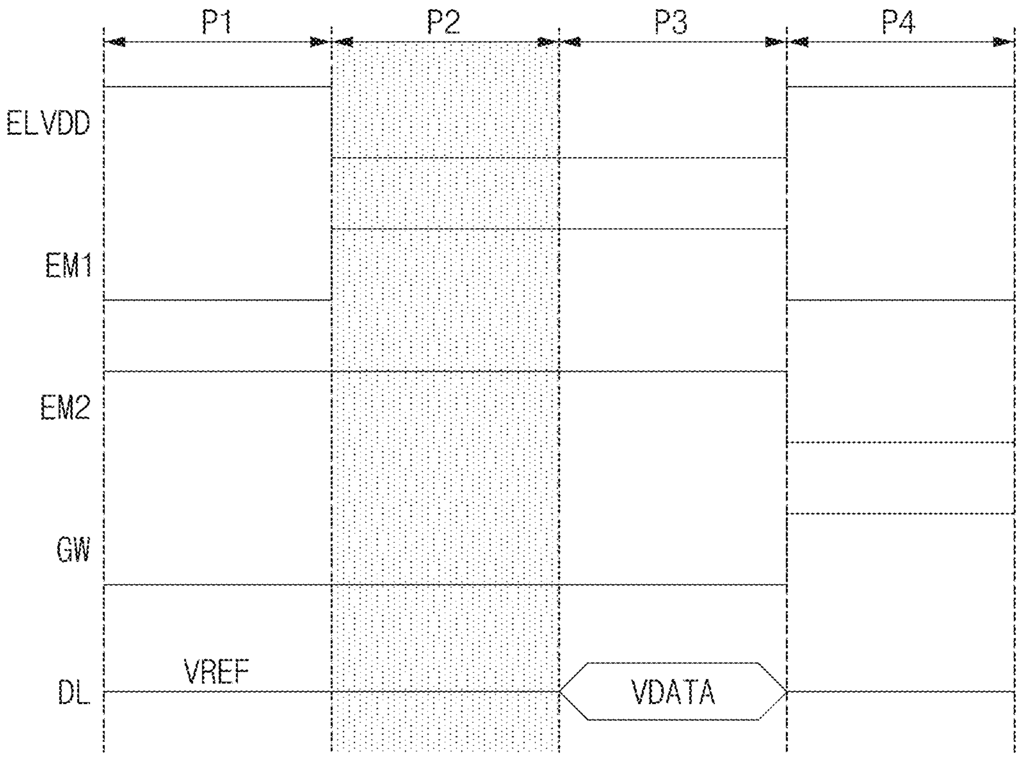
FIGS. 6 and 7 are views for describing the operation of the pixel of FIG. 2 in a second period of FIG. 3.
Figure 7:
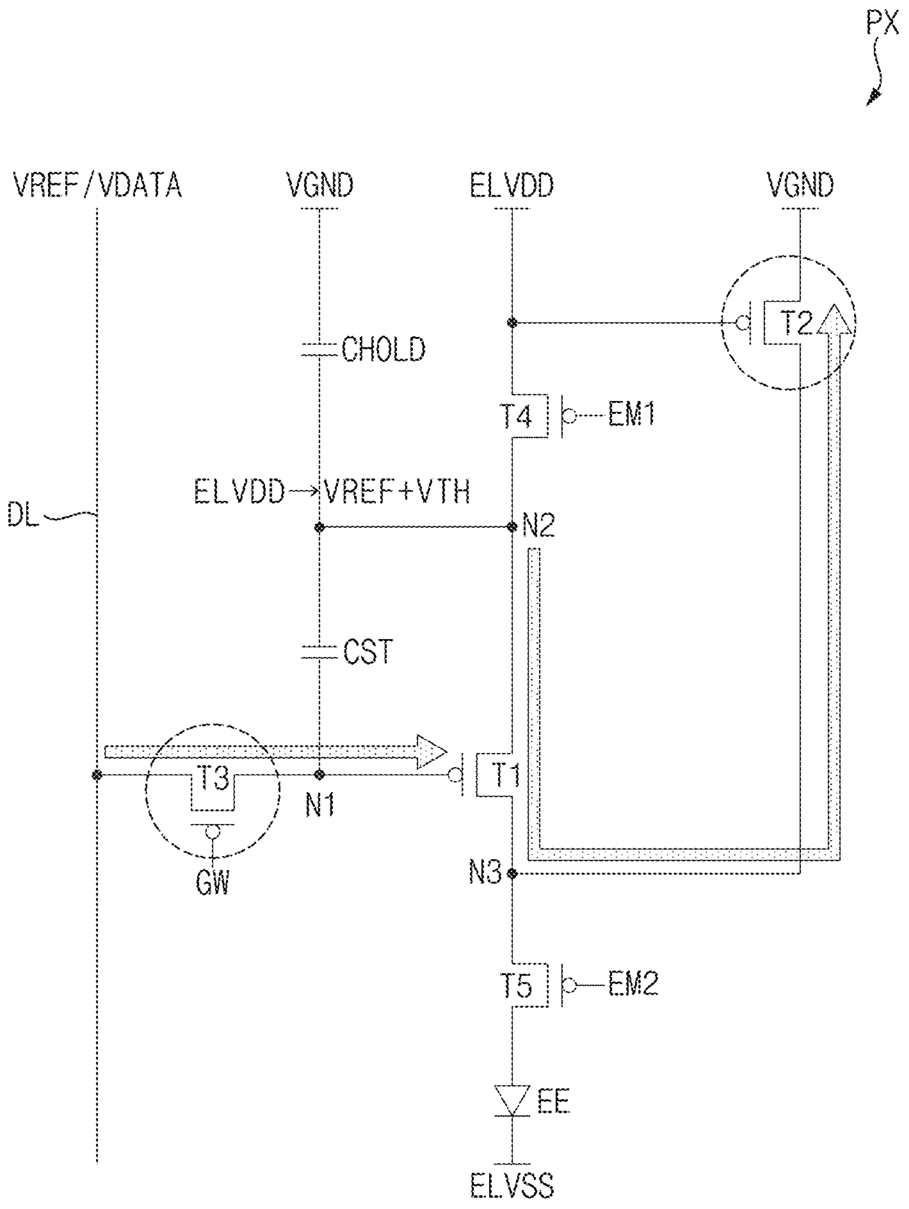

FIGS. 6 and 7 are views for describing the operation of the pixel PX of FIG. 2 in a second period P2 of FIG. 3.

Referring to FIGS. 6 and 7, in the second period P2, the second transistor T2 and the third transistor T3 may be turned on, and the fourth transistor T4 and the fifth transistor T5 may be turned off. For example, in the second period P2, the second transistor T2 and the third transistor T3 are respectively turned on by the first power voltage ELVDD (of a low voltage level) and the gate signal GW (of a low voltage level), and the fourth transistor T4 and the fifth transistor T5 are respectively turned off by the first emission signal EM1 (of a high voltage level) and the second emission signal EM2 (of a high voltage level).

When the data line DL provides the reference voltage VREF, and the third transistor T3 is turned on (e.g., is in an ON state), the third transistor T3 may provide the reference voltage VREF to the first node N1.

When the second transistor T2 is turned on (e.g., is in an ON state), a current path (indicated by an arrow in FIG. 7) may be formed along the first transistor T1 and the second transistor T2, and a current may flow according to the current path from the second node N2 through the first transistor T1 and the second transistor T2. In other words, the first transistor T1 may operate as a source-follower. When the current flows from the second node N2 through the first transistor T1 and the second transistor T2, a voltage at the second node N2 may change from the first power voltage ELVDD of the high voltage level to a value (e.g., VREF+VTH) obtained by summing the reference voltage VREF and a threshold voltage VTH of the first transistor T1. Accordingly, for example, the storage capacitor CST may store the threshold voltage VTH of the first transistor T1, thereby compensating for the threshold voltage VTH of the first transistor T1.

Figure 8:
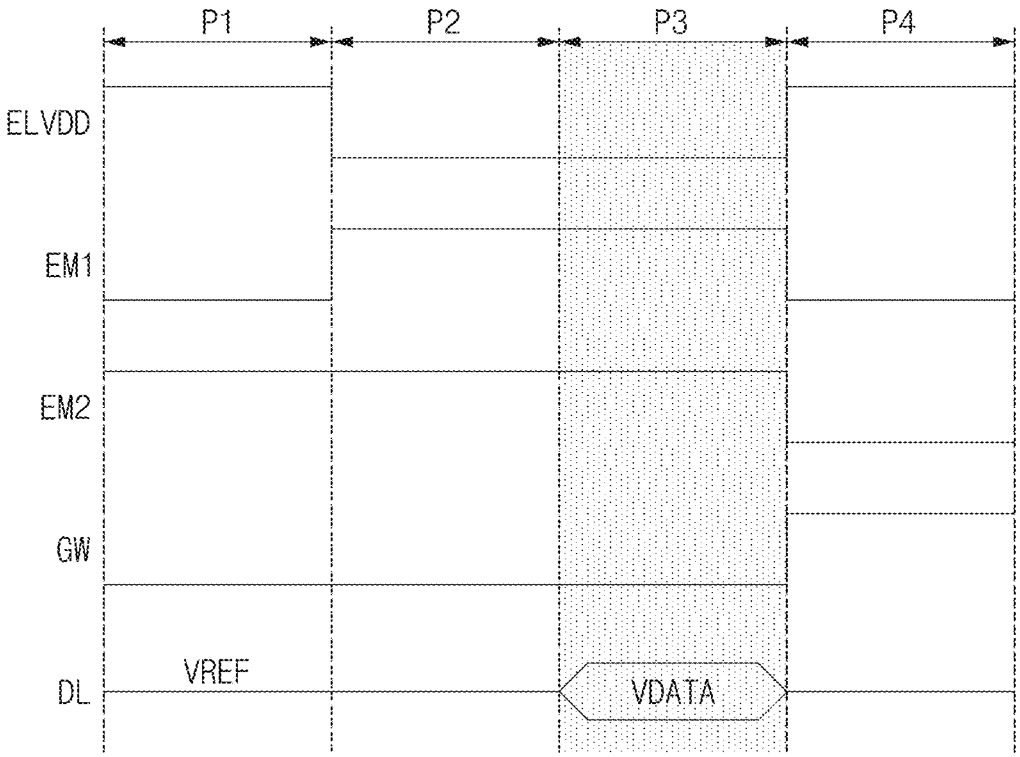
FIGS. 8 and 9 are views for describing the operation of the pixel of FIG. 2 in a third period of FIG. 3.
Figure 9:
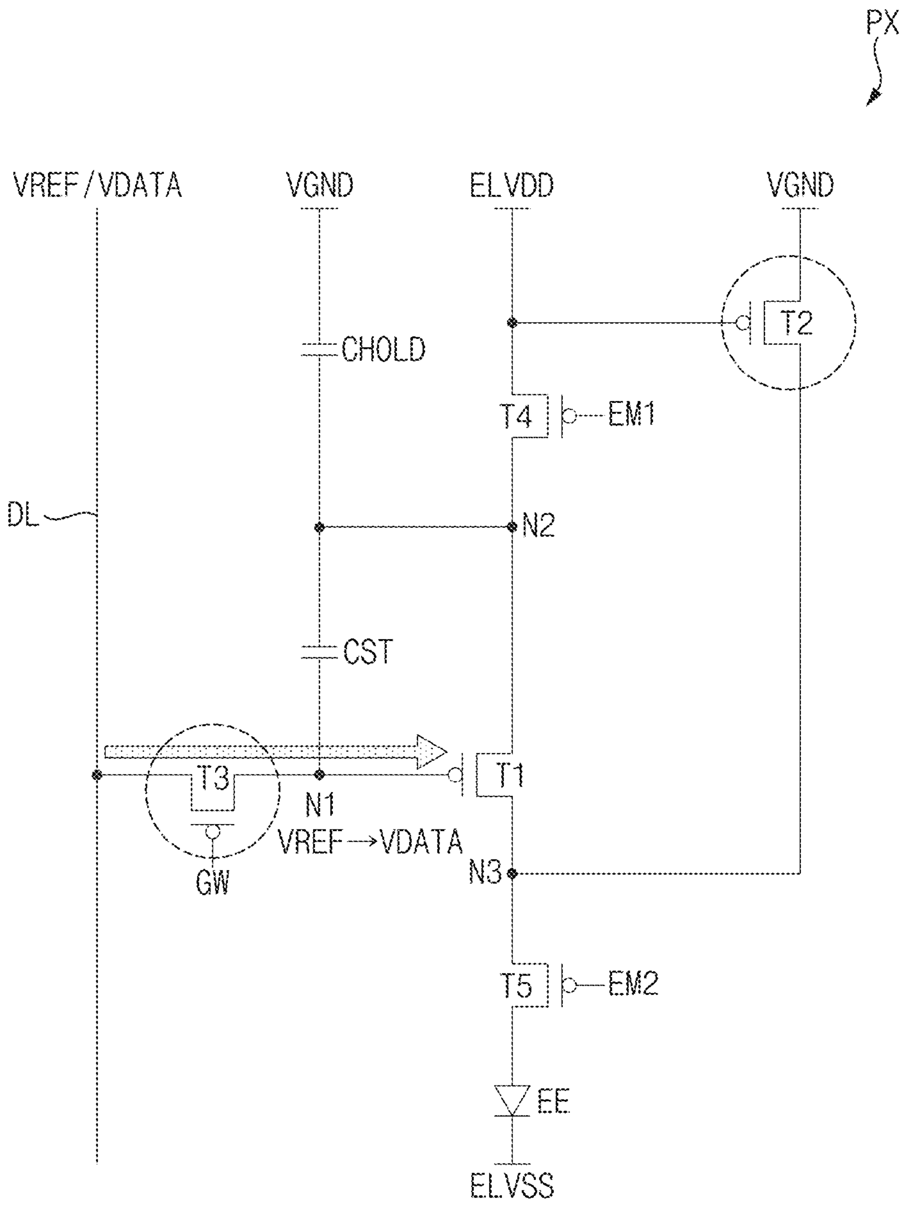

FIGS. 8 and 9 are views for describing the operation of the pixel PX of FIG. 2 in a third period P3 of FIG. 3.

Referring to FIGS. 8 and 9, in the third period P3, the second transistor T2 and the third transistor T3 may be turned on, and the fourth transistor T4 and the fifth transistor T5 may be turned off. For example, in the third period P3, the second transistor T2 and the third transistor T3 may be remain turned on based on the first power voltage ELVDD (of the low voltage level) and the gate signal GW (of the low voltage level), and the fourth transistor T4 and the fifth transistor T5 may remain turned off based on the first emission signal EM1 (of the high voltage level) and the second emission signal EM2 (of the high voltage level).

When the data line DL provides the data voltage VDATA, and the third transistor T3 is turned on (e.g., is in the ON state), the third transistor T3 may provide the data voltage VDATA to the first node N1. Accordingly, for example, the data voltage VDATA may be written to the pixel PX.

A voltage at the first node N1 may be changed from the reference voltage VREF to the data voltage VDATA. Accordingly, for example, the voltage of the second node N2 may be boosted by the storage capacitor CST. In some aspects, the storage capacitor CST and the hold capacitor CHOLD, which are connected to the second node N2, may function as a voltage divider and provide a corresponding voltage to the second node N2. Accordingly, for example, the voltage division may support expanding a data swing range of the data voltage VDATA.

In the first period P1 through the third period P3, the fifth transistor T5 may be turned off, such that light emission of the light emitting element EE caused by a leakage current flowing through the light emitting element EE may be prevented. For example, embodiments of the present disclosure support turning off the fifth transistor T5 in the first period P1 through the third period P3, which may prevent leakage current from flowing through the light emitting element EE, and Accordingly, for example, light emission of the light emitting element EE caused by the leakage current. Therefore, display quality of the display device may be improved.

Figure 10:
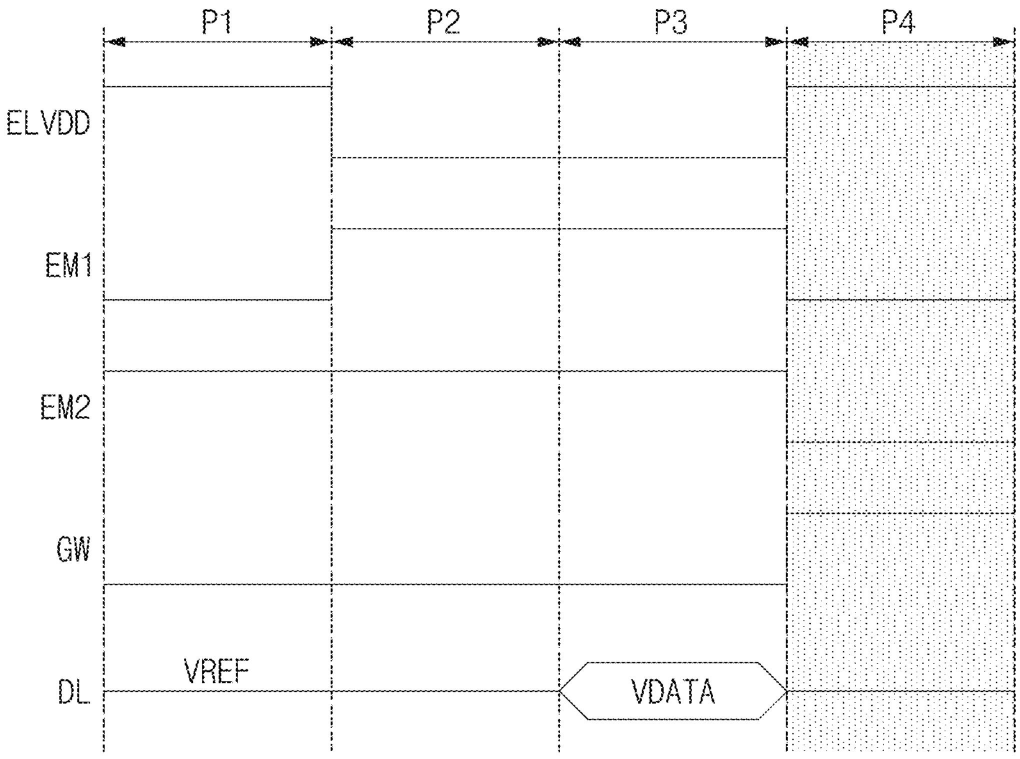
FIGS. 10 and 11 are views for describing the operation of the pixel of FIG. 2 in a fourth period of FIG. 3.
Figure 11:
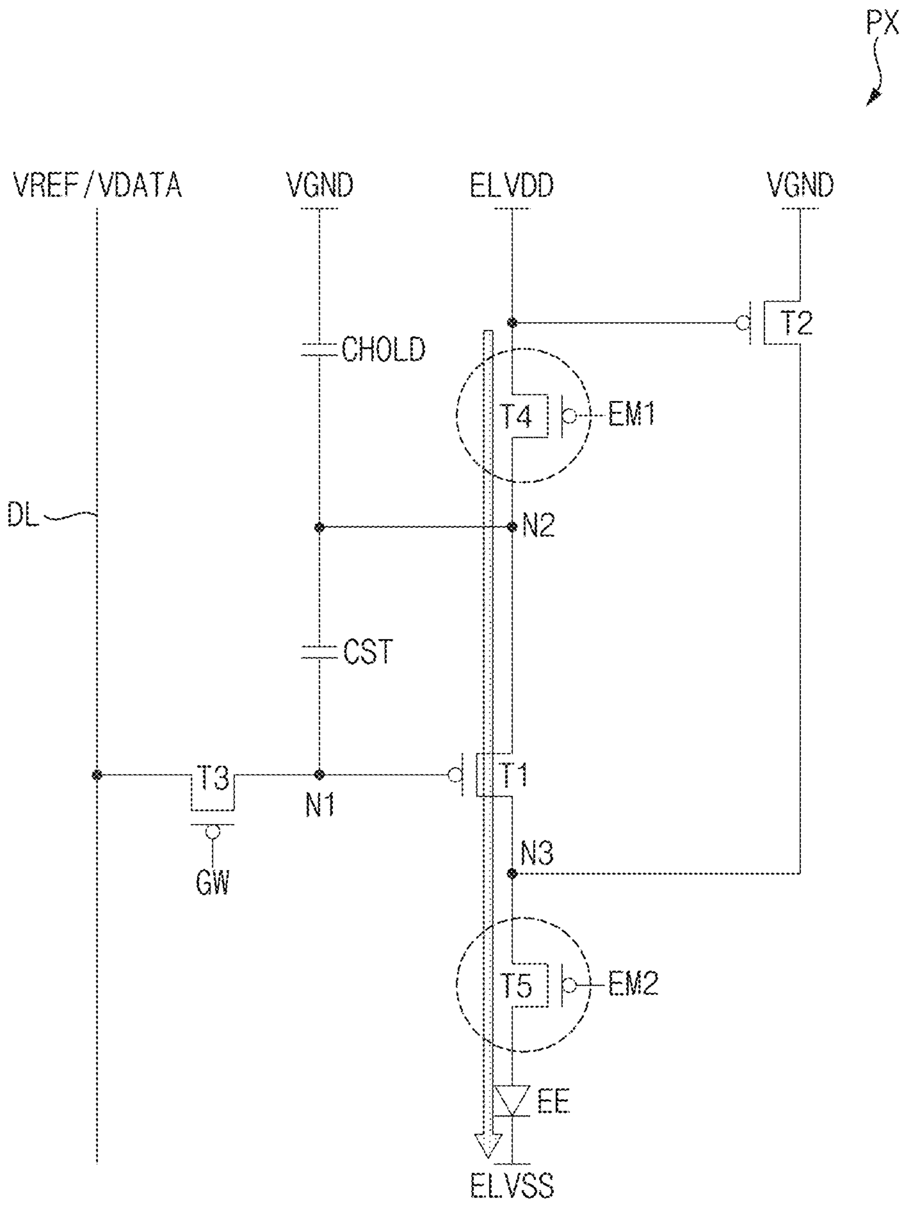

FIGS. 10 and 11 are views for describing the operation of the pixel PX of FIG. 2 in a fourth period P4 of FIG. 3.

Referring to FIGS. 10 and 11, in the fourth period P4, the fourth transistor T4 and the fifth transistor T5 may be turned on, and the second transistor T2 and the third transistor T3 may be turned off. For example, in the fourth period P4, the fourth transistor T4 and the fifth transistor T5 are respectively turned on by first emission signal EM1 (of a low voltage level) and the second emission signal EM2 (of a low voltage level), and the second transistor T2 and the third transistor T3 are respectively turned off by the first power voltage ELVDD (of a high voltage level) and the gate signal GW (of a high voltage level).

The first transistor T1 may generate a driving current corresponding to the data voltage VDATA for which the threshold voltage VTH of the first transistor T1 is compensated, and the driving current of the first transistor T1 may flow to the light emitting element EE. The light emitting element EE may emit a light of a luminance value corresponding to the driving current.

The display device 100 may apply the first power voltage ELVDD to the gate electrode of the second transistor T2 according to high and low voltage levels as described herein (e.g., switching between the high voltage level and the low voltage level as described herein), and since the second transistor T2 is turned on in response to the first power voltage ELVDD having the alternating voltage levels, a signal for driving the second transistor T2 may be omitted. That is, for example, aspects of the display device 100 described herein may set the voltage level of the first power voltage ELVDD to a high voltage level or a low voltage level in association with turning the second transistor T2 on or off, and thus the display device 100 may be implemented without using a separate signal for driving the second transistor T2. Accordingly, for example, the display device 100 may be implemented without a line configured to transmit the signal for driving the second transistor T2 (e.g., the line may be omitted), and the pixel PX may have a reduced area due to the omission of the line compared to other pixels. In the second period P2, the first transistor T1 may operate as a source-follower, thereby compensating for the threshold voltage VTH of the first transistor T1. In the third period P3, the voltage division performed on the voltage at the second node N2 by the storage capacitor CST and the hold capacitor CHOLD may support expanding the data swing range. Since the fifth transistor T5 is turned off in the first period P1 through the third period P3, and not in the fourth period P4, which is the emission period, the light emission of the light emitting element EE caused by the leakage current flowing through the light emitting element EE may be prevented.

Figure 12:
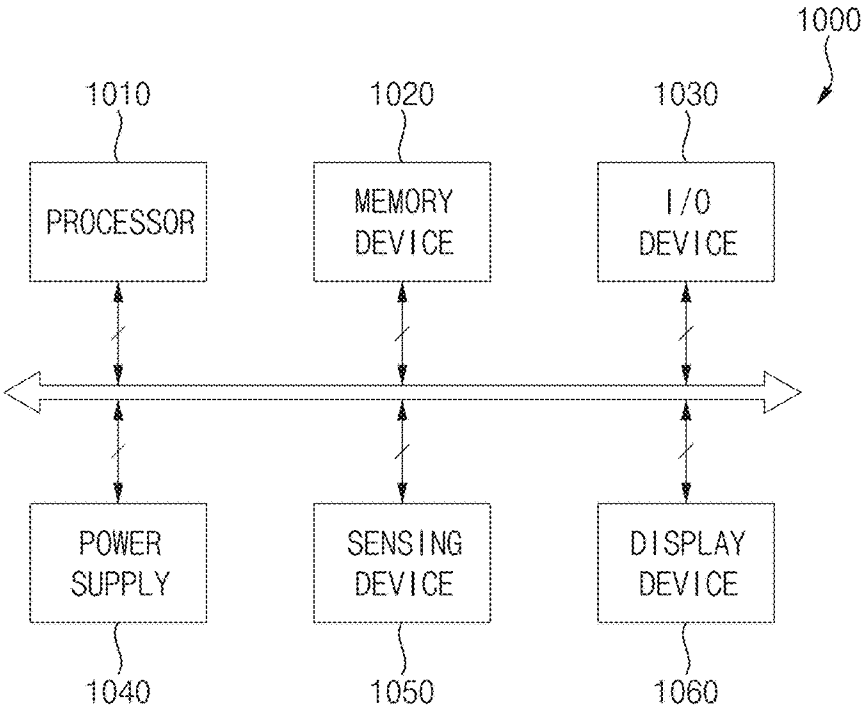
FIG. 12 is a block diagram illustrating an electronic device according to an embodiment of the present disclosure.

FIG. 12 is a block diagram illustrating an electronic device 1000 according to an embodiment of the present disclosure.

Referring to FIG. 12, an electronic device 1000 may include a processor 1010, a memory device 1020, an input/output (I/O) device 1030, a power supply 1040, a sensing device 1050, and a display device 1060. Components of the electronic device 1000 are not limited to the components illustrated in FIG. 12, and the electronic device 1000 may have more or fewer components than the components illustrated in FIG. 12.

The processor 1010 may perform specific calculations or tasks. The processor 1010 may control an overall operation of the electronic device 1000. According to an embodiment, the processor 1010 may be a microprocessor, a central processing unit (CPU), or the like. The processor 1010 may be connected to other components through an address bus, a control bus, a data bus, and the like. According to an embodiment, the processor 1010 may also be connected to an expansion bus such as, for example, a peripheral component interconnect (PCI) bus.

The memory device 1020 may store data required for an operation of the electronic device 1000. For example, the memory device 1020 may include: a nonvolatile memory device such as, for example, an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), or a ferroelectric random access memory (FRAM); and/or a volatile memory device such as, for example, a dynamic random access memory (DRAM), a static random access memory (SRAM), or a mobile DRAM.

The I/O device 1030 may include: an input device including a camera or an image input device configured to input an image signal, a microphone or an audio input device configured to input an audio signal, a user input device (e.g., a touch key, a push key, a joystick, a wheel, or the like) configured to receive information from a user, and the like; and an output device including an audio output device, a haptic module, an optical output device, and the like configured to generate an output associated with visual sensation, auditory sensation, tactile sensation, or the like.

The power supply 1040 may supply a power associated with the operation of the electronic device 1000. The power supply 1040 may receive an external power and an internal power, and the power supply 1040 may supply the power to each of the components included in the electronic device 1000. The power supply 1040 may be implemented as a built-in battery or a replaceable battery.

The sensing device 1050 may include at least one sensor configured to sense information on a peripheral environment of the electronic device 1000, information on a user of the electronic device 1000, and the like. For example, the sensing device 1050 may include a speed sensor, an acceleration sensor, a gravity sensor, an illumination sensor, a motion sensor, a fingerprint recognition sensor, an optical sensor, an ultrasonic sensor, a heat sensor, and the like.

The display device 1060 may be connected to other components through the buses or other communication links. The display device 1060 may display information processed by the electronic device 1000. The display device 1060 may correspond to the display device 100 of FIG. 1.

Figure 13:
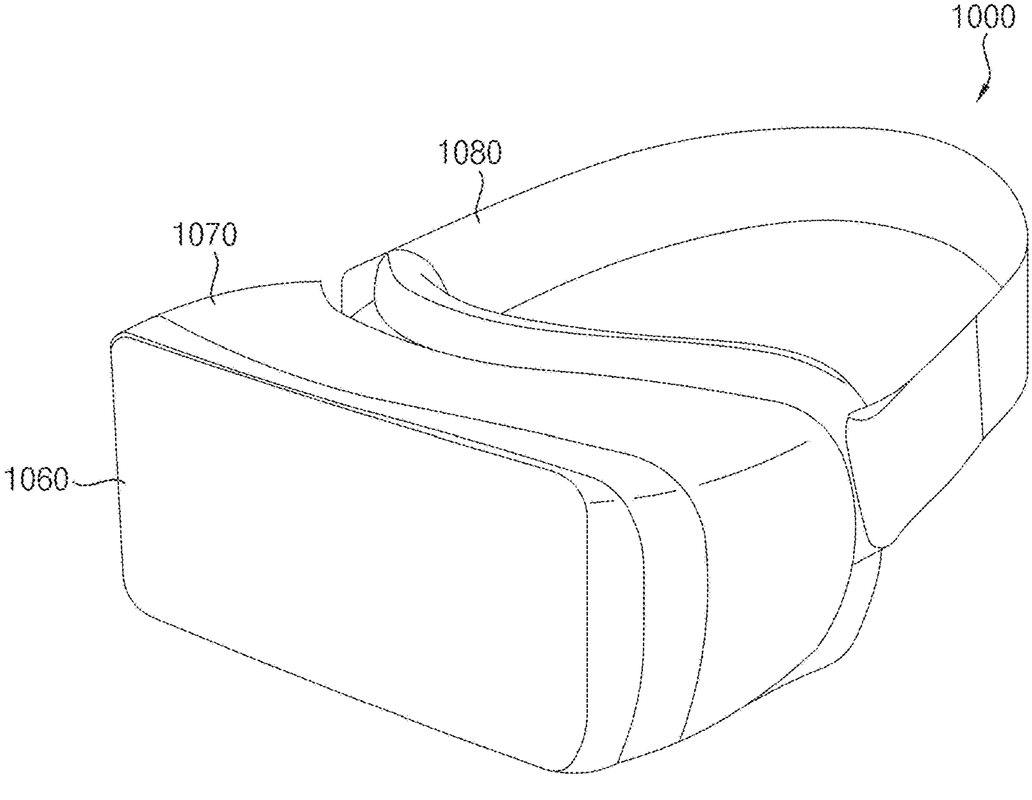
FIG. 13 is a view illustrating one example in which the electronic device of FIG. 12 is implemented as a head-mounted display (HMD).

FIG. 13 is a view illustrating one example in which the electronic device 1000 of FIG. 12 is implemented as a head-mounted display (HMD).

Referring to FIG. 13, the electronic device 1000 may include a display device 1060, a housing 1070, and a mounting part 1080. The electronic device 1000 may be mounted on a head of a user to provide image information to the user. The display device 1060 may display an image based on image data. The display device 1060 may provide the image to each of left and right eyes of the user. A left eye image corresponding to the left eye of the user and a right eye image corresponding to the right eye of the user may be identical to or different from each other. The electronic device 1000 may provide a two-dimensional image, a three-dimensional image, virtual reality (VR), augmented reality (AR), a 360-degree panoramic image, or the like through the display device 1060.

The display device 1060 may be a liquid crystal display device, an organic light emitting display device, an inorganic light emitting display device, a quantum dot light emitting display device, or the like. The display device 1060 may be mounted in the housing 1070. Additionally, or alternatively, the display device 1060 may be coupled to the housing 1070. The display device 1060 may receive an instruction through an interface unit or the like provided in the housing 1070.

The housing 1070 may be located in front of the eyes of the user. The housing 1070 may store the components configured to operate the electronic device 1000. In some aspects, a wireless communication unit, the interface unit, and the like may be located in the housing 1070. The wireless communication unit may perform wireless communication with an external terminal and receive an image signal from the external terminal. For example, the wireless communication unit may communicate with the external terminal by using Bluetooth, radio frequency identification (RFID), infrared data association (IrDA), ZigBee, near field communication (NFC), wireless-fidelity (Wi-Fi), ultra-wideband (UWB), or the like. The interface unit may connect the electronic device 1000 to an external device. For example, the interface unit may include at least one of a wired/wireless headset port, an external charger port, a wired/wireless data port, a memory card port, a port configured to connect a device provided with an identification module, an audio I/O port, a video I/O port, and an earphone port.

The mounting part 1080 may be connected to the housing 1070 to fix the electronic device 1000 to the head of the user. For example, the mounting part 1080 may be implemented as a belt, a band having elasticity, or the like.

The display device according to the embodiments may be applied to a display device included in a HMD, a computer, a notebook, a mobile phone, a smart phone, a smart pad, a PMP, a PDA, an MP3 player, or the like.

Although the pixels and the display devices according to the embodiments have been described with reference to the drawings, the illustrated embodiments are examples, and the embodiments may be modified and changed by a person having ordinary knowledge in the relevant technical field without departing from the technical spirit described in the following claims.

What is claimed is:

1. A pixel comprising:

a first transistor including a gate electrode connected to a first node, a first electrode connected to a second node, and a second electrode connected to a third node;

a second transistor including a gate electrode configured to receive a first power voltage, a first electrode configured to receive a second power voltage, and a second electrode connected to the third node;

a third transistor including a gate electrode configured to receive a gate signal, a first electrode connected to a data line configured to provide a reference voltage or a data voltage, and a second electrode connected to the first node;

a fourth transistor including a gate electrode configured to receive a first emission signal, a first electrode configured to receive the first power voltage, and a second electrode connected to the second node;

a fifth transistor including a gate electrode configured to receive a second emission signal, a first electrode connected to the third node, and a second electrode;

a storage capacitor including a first electrode connected to the first node and a second electrode connected to the second node; and a light emitting element including an anode electrode connected to the second electrode of the fifth transistor and a cathode electrode configured to receive a third power voltage.

2. The pixel of claim 1, wherein the first power voltage is alternated according to a first voltage level and a second voltage level.

3. The pixel of claim 1, further comprising a hold capacitor including:

a first electrode configured to receive the second power voltage, and a second electrode connected to the second node.

4. The pixel of claim 3, wherein, in a first period, each of the first power voltage and the second emission signal is of a high voltage level, each of the first emission signal and the gate signal is of a low voltage level, and the data line provides the reference voltage.

5. The pixel of claim 4, wherein, in the first period, the reference voltage is applied to the first node, and the first power voltage of the high voltage level is applied to the second node.

6. The pixel of claim 4, wherein, in a second period after the first period, each of the first power voltage and the gate signal is of the low voltage level, each of the first emission signal and the second emission signal is of the high voltage level, and the data line provides the reference voltage.

7. The pixel of claim 6, wherein, in the second period, the storage capacitor stores a threshold voltage of the first transistor.

8. The pixel of claim 6, wherein, in the second period, a current flows from the second node through the first transistor and the second transistor.

9. The pixel of claim 6, wherein, in a third period after the second period, each of the first power voltage and the gate signal is of the low voltage level, each of the first emission signal and the second emission signal is of the high voltage level, and the data line provides the data voltage.

10. The pixel of claim 9, wherein, in the third period, the data voltage is applied to the first node.

11. The pixel of claim 9, wherein, in the third period, voltage division is performed on a voltage of the second node by the storage capacitor and the hold capacitor.

12. The pixel of claim 9, wherein, in a fourth period after the third period, each of the first power voltage and the gate signal is of the high voltage level, each of the first emission signal and the second emission signal is of the low voltage level, and the data line provides the reference voltage.

13. The pixel of claim 12, wherein, in the fourth period, a driving current of the first transistor flows to the light emitting element.

14. The pixel of claim 1, wherein the second power voltage is of a ground voltage level.

15. The pixel of claim 1, wherein each of the first transistor, the second transistor, the third transistor, the fourth transistor, and the fifth transistor is a P-type transistor.

16. A display device comprising:

a display panel including a pixel; and a display panel driver configured to drive the display panel, wherein the pixel comprises:

a first transistor including a gate electrode connected to a first node, a first electrode connected to a second node, and a second electrode connected to a third node;

a second transistor including a gate electrode configured to receive a first power voltage, a first electrode configured to receive a second power voltage, and a second electrode connected to the third node;

a third transistor including a gate electrode configured to receive a gate signal, a first electrode connected to a data line configured to provide a reference voltage or a data voltage, and a second electrode connected to the first node;

a fourth transistor including a gate electrode configured to receive a first emission signal, a first electrode configured to receive the first power voltage, and a second electrode connected to the second node;

a fifth transistor including a gate electrode configured to receive a second emission signal, a first electrode connected to the third node, and a second electrode;

a storage capacitor including a first electrode connected to the first node and a second electrode connected to the second node; and a light emitting element including an anode electrode connected to the second electrode of the fifth transistor and a cathode electrode configured to receive a third power voltage.

17. The display device of claim 16, wherein the display device is configured to alternate the first power voltage according to a first voltage level and a second voltage level.

18. The display device of claim 16, wherein the pixel further comprises a hold capacitor including:

a first electrode configured to receive the second power voltage, and a second electrode connected to the second node.

19. The display device of claim 16, wherein the second power voltage is of a ground voltage level.

20. The display device of claim 16, wherein each of the first transistor, the second transistor, the third transistor, the fourth transistor, and the fifth transistor is a P-type transistor.

* * * * *